2,861,983

CATALYTIC PROCESS FOR THE PRODUCTION OF SOLID POLYMERS OF ETHYLENE BY THE USE OF LITHIUM

Peter Fotis, Jr., Highland, Ind., assignor to Standard Oil Company, Chicago, Ill., a corporation of Indiana No Drawing. Application September 30, 1954
Serial No. 459,514

10 Claims. (Cl. 260—94.9)

This invention relates to a novel catalytic process for the conversion of ethylene to normally solid polymeric materials. More particularly, the present invention relates to a process for the conversion of ethylene to polymers by contact with lithium.

One object of my invention is to provide novel and highly useful catalysts for the preparation of normally solid polymers from ethylene or ethylene-containing gas mixtures. Another object is to provide a relatively low temperature, low pressure process for the conversion of gas streams containing ethylene into substantial yields of normally solid polymers having molecular weights ranging upwardly from 300 or specific viscosities, as hereinafter defined, above about 1000.

Briefly, the inventive process comprises the conversion of ethylene to polymeric materials including normally solid polymers ranging in consistency from grease-like to wax-like polymers, by contacting ethylene with lithium at a suitable polymerization temperature between about 100° C. and about 350° C. for a period of time sufficient to effect the desired conversion, followed by recovery of the solid polymeric materials thus produced. The partial pressure of ethylene in the polymerization operation may range upwardly from about one atmosphere, but at ethylene partial pressures below about 500 p. s. i., the polymerization rate is relatively low; in order to obtain more desirable rates of ethylene polymerization to produce normally solid polymers, I prefer to employ ethylene partial pressures within the polymerization zone in excess of 500 p. s. i., for example pressures within the range of about 500 to about 5000 p. s. i.

When lithium is employed without a supporting material, I prefer to employ polymerization temperatures in excess of the melting point of lithium. For use in my invention, lithium may be supported and extended by suitable methods upon porous or non-porous solid materials.

Suitable supports for lithium include the well known catalyst carriers. Examples of porous supporting materials are various inorganic gels or precipitates such as silica, titania, zirconia and aluminas. Activated carbons, especially activated coconut charcoal, are also suitable porous supporting materials for lithium. Even various salts, such as sodium chloride and the like, may be employed as supports for lithium in the polymerization process of my invention.

The most suitable alumina supports for lithium include the activated adsorptive aluminas of commerce, which are known to be members of the gamma-alumina family, including the so-called eta-alumina (note, for example, P. J. Nahin et al., Ind. Eng. Chem., 2021 (1949); H. C. Stumpf et al., Ind. Eng. Chem., 42, 1398–1403 (1950); M. K. B. Day et al., J. Phys. Chem., 57, 946–950 (December 1953); J. F. Brown et al., J. Chem. Soc., 1953, 84); argillaceous materials, particularly montmorillonitic clays and bauxite, for example, clays and clay-like materials which have heretofore been employed in the catalytic cracking of hydrocarbon oils to produce gasoline, such as the acid-treated clays (Filtrol, Superfiltrol, etc.); synthetic silica-alumina composites containing at least about 1% of alumina, for example, the calcined silica-alumina composites (which may also contain magnesia, thoria or zirconia) which have heretofore been employed in the catalytic cracking of hydrocarbon oils (note, for example, "Advances in Catalysis," vol. IV, pages 1+, especially pages 6 and 7, by R. C. Hansford, published by Academic Press, Inc., N. Y., 1952, and, in the same volume, a chapter by H. E. Ries, Jr., pages 87 and following, especially the tables at pages 93–4); and fluorided gamma-aluminas. Gamma-aluminas may be employed containing up to about 90 weight percent of oxides of metals such as titania and zirconia.

Desirable alumina-containing adsorbent materials have BET surface areas in the range of about 100 to about 700 square meters per gram, more often about 150 to 300 square meters per gram, and average pore radius of about 10 to 100 A., usually of the order of about 25 A.

The supported lithium may be of colloidal dimensions or may have an area just exceeding the atomic area of lithium.

The dispersion of the lithium on the supporting material can be effected by any known method and the method of dispersion does not, per se, form part of the present invention. For example, the dispersion of lithium on the supporting material may be effected by melting lithium onto the heated supporting material, employed in the form of a powder, in the presence of a fluidized stream of an inert gas such as helium, which serves to maintain the supporting particles in the form of an agitated or fluidized bed. The lithium may be dispersed onto the supporting material in the absence of a fluidizing gas, while effecting agitation of the supporting material by conventional mixing techniques. Another technique involves contacting a dispersion of lithium in a hydrocarbon reaction medium with particles of the supporting material. Other methods known in the art for distributing alkali metals on solid supports may also be employed.

Lithium and solid supporting materials can be added as discrete masses to the polymerization reaction zone. It is possible that even when lithium and the solid supporting materials are added separately to the reaction zone, they combine therein to produce a catalyst which is a dispersion of lithium upon the supporting material. It will be understood, however, that I am not bound by any theoretical explanation.

The concentration of lithium with respect to the solid supporting material may range from about 1 to about 50% by weight and is usually of the order of about 5 to about 25% by weight. The catalyst can be employed in various forms and sizes, e. g., as powder, granules, microspheres, lumps, or shaped pellets.

The proportion of lithium, based on ethylene, should be at least 1 weight percent and can be, for example, within the range of about 5 to about 25 weight percent.

Instead of dispersing lithium on a solid support, I may disperse it in very finely-divided form in an inert liquid hydrocarbon medium, such as a saturated hydrocarbon.

The ethylene charging stock may contain inert hydrocarbons, as in refinery gas streams, for example, methane, ethane, propane, etc. However, it is preferred to employ as pure and concentrated ethylene charging stocks as it is possible to obtain. It is desirable to minimize or avoid the introduction of higher olefins, acetylene, oxygen, carbon dioxide, water, sulfur compounds or other reactive materials into contact with the catalyst.

The ethylene can be polymerized in the gas phase by contact with the catalyst. Upon completion of the desired polymerization reaction it is then possible to treat the catalyst for the recovery of the solid polymerization products, for example by extraction with suitable solvents, particularly low-boiling aromatics such as benzene, toluene, xylenes, etc.

When a maximum yield of solid polymers is sought, it is highly desirable to supply to the reaction zone a liquid medium which undergoes little or no reaction with ethylene and which serves both as a reaction medium and a solvent for the solid reaction products. Suitable liquid reaction media for ethylene polymerization include liquid saturated hydrocarbons, viz. alkanes and cycloalkanes.

Either pure liquid alkanes or cycloalkanes or commercially available mixtures, freed of catalyst poisons, can be employed. For example, I can employ straight run naphthas or kerosenes containing alkanes and cycloalkanes. Specifically, I can employ liquid or liquefied alkanes such as n-butane, n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

Aromatic hydrocarbons such as benzene, t-alkylbenzenes, t-butylbenzene, and similar aromatic hydrocarbons which contain no alkyl groups in which hydrogen is bound to the alpha carbon atom of the alkyl group, may also be used, providing the severity of reaction conditions (especially time and temperature) is minimized to avoid substantial alkylation of these hydrocarbons by the ethylene. Examples illustrative of these conditions are provided hereinafter.

Alkylbenzenes such as toluene, ethylbenzene, xylenes and the like may be employed, but are not preferred.

The liquid hydrocarbon reaction medium should be freed of catalyst poisons before use in the present invention by treatment with calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

Although the ethylene polymerization temperature range encompasses temperatures between about 100° C. and about 350° C., ordinarily I prefer to employ the range of about 125° C. to about 250° C. with supported lithium catalysts in order to maximize the yield of solid or high molecular weight polymer. With unsupported lithium, I prefer to use the temperature range of about 190° C. to about 300° C.

Ethylene partial pressures may be varied within the range of about 15 p. s. i. g. to the maximum pressure which can economically be employed in suitable commercial equipment, for example up to as much as 50,000 p. s. i. g. A convenient ethylene partial pressure range for the manufacture of solid polymers by the use of the present catalysts is about 200 to about 10,000 p. s. i., which constitutes a distinct advantage over the commercial high pressure ethylene polymerization processes which apparently require operating pressures in the range of about 20,000 to about 50,000 p. s. i.

The contact time or space velocity employed in the polymerization process will be selected with reference to the other variables, catalysts, the specific type of product desired and the extent of ethylene conversion desired in any given run or pass over the catalyst. In general, this variable is readily adjustable to obtain the desired results. In operations in which the ethylene is caused to flow continuously into and out of contact with the solid catalyst, suitable liquid hourly space velocities are usually selected between about 0.1 and about 10 volumes, preferably about 0.5 to 5 or about 2 volumes of ethylene solution in a substantially unreactive liquid hydrocarbon reaction medium. The amount of ethylene in such solution may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. In general, the rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the catalyst particles or fragments may occur, resulting in catalyst carry-over as fines with the solution of polymerization products and extensive loss of catalyst from the reactor.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone.

In batch operations, operating periods between one-half and about 20 hours, usually between about 1 and about 4 hours, are employed and the reaction autoclave is charged with ethylene as the pressure falls as a result of the olefin conversion reaction.

The following specific examples and data are introduced in order to illustrate but not unduly to limit the invention. The exemplary operations were effected in 250 cc. capacity stainless steel-lined pressure vessels provided with a magnetically-actuated stirrup-type stirrer which was reciprocated through the reaction zone (Magne-Dash reactors). Specific viscosities (Staudinger) which are reported hereinafter are defined as relative viscosity minus one, and relative viscosity is the ratio of the time of efflux of a solution of 0.125 g. polymer in 100 cc. of C. P. xylenes at 110° C. from the viscosimeter as compared with the time of efflux of 100 cc. of C. P. xylenes at 110° C. Melt viscosities were determined by the method of Dienes and Klemm, J. Appl. Phys., 17, 458–71 (1946).

*Example 1*

The reactor was charged with 50 ml. of n-heptane ($n_D^{20}$ 1.3874), 0.52 g. (0.075 mol) of lithium and 23 g. of ethylene and stirring was initiated. The temperature of the reactor contents was raised to 250° C., resulting in the maximum pressure of 1650 p. s. i. Over a reaction period of 17 hours there was a pressure drop of 400 p. s. i. The reactor was then allowed to cool to room temperature, gases were vented, the lithium was decomposed by the addition of methanol and the hydrocarbon products were separated as follows. The normally liquid materials were distilled to separate a liquid having a refractive index ($n_D^{20}$) of 1.3920, being low molecular weight polymers of ethylene, from the n-heptane diluent. The solid materials were extracted with boiling xylenes. On cooling the xylenes solution, 1.2 g. of a solid wax-like polyethylene, M. P. 105 to 110° C., separated. From the remaining xylenes solution, dilution with acetone precipitated 0.3 g. of a waxy solid, M. P. 35–45° C.

*Example 2*

The catalyst was prepared by deposition of 2 g. of lithium on 10 g. of an activated adsorptive (gamma) alumina at about 280° C. in a helium atmosphere. The reactor was charged with the catalyst, 100 ml. of benzene and pressured with ethylene. Reaction was effected at 141° C. for 19 hours under an initial ethylene pressure of about 1000 p. s. i. This reaction yielded 1.2 g. of solid polyethylenes having a specific viscosity of $6000 \times 10^{-5}$.

*Example 3*

The catalyst was 1 gram of lithium supported on 10 grams of an activated coconut charcoal. The reactor was charged with the catalyst, 100 ml. of n-heptane and the contents were heated with stirring under ethylene pressure at 220° C. for 17 hours. The maximum pressure in the reaction zone was 1275 p. s. i. and the pressure drop over the reaction period was 700 p. s. i. The reaction mixture was worked up as before to yield 2.1 grams of a normally solid polymer of ethylene. It was shown by redistillation of the solvent that the n-heptane was unaffected by the ethylene reaction.

*Example 4*

The catalyst was prepared by adsorbing 1 g. of molten lithium on commercial titanium dioxide powder. The reactor was charged with the catalyst, 100 ml. of benzene and the contents were heated with stirring under ethylene pressure to 140° C. for 16 hours. The maximum ethylene pressure was 1200 p. s. i. The reaction mixture was worked up as before. It was found that the reaction yielded 1.7 g. of solid polyethylenes having a specific viscosity of $7400 \times 10^{-5}$. Less than 5 weight percent of the benzene diluent was alkylated by the ethylene.

*Example 5*

The catalyst was prepared by adsorbing 1 g. of molten lithium on 10 g. of an activated coconut charcoal. The reactor was charged with the catalyst, 100 ml. of benzene and ethylene, and reaction was effected under the same operating conditions as in Example 4. The reaction yielded 2.1 g. of solid polyethylenes having a specific viscosity of $12,300 \times 10^{-5}$. Less than 5 weight percent of the benzene diluent was alkylated by the ethylene.

When the process of Example 5 was repeated but the lithium catalyst was replaced by 1 g. of sodium deposited upon 10 g. of an activated charcoal, no solid polyethylenes were produced; instead, extensive alkylation of benzene occurred.

A catalyst was prepared by adsorbing 1 g. of molten sodium on 10 g. of powdered sodium chloride. The reactor was charged with the catalyst, 100 ml. of benzene and ethylene, and reaction was effected under the same operating conditions as in Example 4. No conversion of ethylene was apparent, i. e. no pressure drop was observed on a pressure gauge connected to the reactor.

The polymers produced by the process of the present invention, especially the polymers having high specific viscosities, can be blended with polyethylenes produced by other processes. The solid polymers produced by the process of the present invention can be blended in desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or a mixture of sulfur dioxide and chlorine, sulfonation, and other reactions to which hydrocarbons may be subjected.

The use of alkali metals having atomic numbers of at least 11 in conjunction with alumina-containing adsorbents for the polymerization of ethylene to produce normally solid polymers is described and claimed in my co-pending application for United States Letters Patent, filed of even date herewith, Serial No. 459,516, filed September 30, 1954.

Having thus described my invention, what I claim is:

1. A process for producing a solid polymer, which process comprises introducing a charging stock consisting essentially of ethylene and a catalyst consisting essentially of lithium into a polymerization zone, effecting contacting of ethylene and lithium in said zone at a temperature between about 100° C. and about 350° C. at an ethylene partial pressure of at least 500 p. s. i., and recovering a solid polymer thus produced.

2. The process of claim 1 wherein said contacting is effected in the presence of a liquid diluent hydrocarbon which is substantially unreactive under the selected ethylene polymerization conditions.

3. The process of claim 1 wherein the said polymerization temperature is between about 190° C. and about 300° C.

4. A process for producing a solid polymer, which process comprises introducing a charging stock consisting essentially of ethylene and a catalyst consisting essentially of lithium supported upon a solid, granular, inert supporting material into a polymerization zone, effecting contacting of ethylene and said catalyst in said zone at a suitable polymerization temperature between about 100° C. and about 350° C. at an ethylene partial pressure of at least about 500 p. s. i., and recovering a solid polymer thus produced.

5. The process of claim 4 wherein said contacting is effected in the presence of a substantially inert liquid diluent hydrocarbon.

6. The process of claim 4 wherein said supporting material is alumina.

7. The process of claim 4 wherein said supporting material is activated carbon.

8. The process of claim 4 wherein said supporting material is titania.

9. The process of claim 4 wherein said supporting material is zirconia.

10. The process of claim 4 wherein said supporting material is sodium chloride.

References Cited in the file of this patent

UNITED STATES PATENTS

| Number | Name | Date |
|---|---|---|
| 2,212,155 | Ellis | Aug. 20, 1940 |
| 2,355,925 | Reid | Aug. 15, 1944 |
| 2,467,245 | Whitman | Apr. 12, 1949 |
| 2,691,647 | Field | Oct. 12, 1954 |
| 2,699,457 | Ziegler | Jan. 11, 1955 |
| 2,771,463 | Field et al. | Nov. 20, 1956 |